(12) United States Patent
Wang et al.

(10) Patent No.: US 11,065,726 B2
(45) Date of Patent: Jul. 20, 2021

(54) SCREW-PRESENTING DEVICE

(71) Applicants: FOXCONN PRECISION ELECTRONICS (TAIYUAN) CO., LTD., Taiyuan (CN); HON HAI PRECISION INDUSTRY CO., LTD., New Taipei (TW)

(72) Inventors: Jun-Yan Wang, Taiyuan (CN); Yong Liu, Taiyuan (CN); Jen-Chang Huang, New Taipei (TW); Wen-Shou Tseng, New Taipei (TW)

(73) Assignees: FOXCONN PRECISION ELECTRONICS (TAIYUAN) CO., LTD., Taiyuan (CN); HON HAI PRECISION INDUSTRY CO., LTD., New Taipei (TW)

( * ) Notice: Subject to any disclaimer, the term of this patent is extended or adjusted under 35 U.S.C. 154(b) by 64 days.

(21) Appl. No.: 16/658,501

(22) Filed: Oct. 21, 2019

(65) Prior Publication Data
US 2020/0406408 A1 Dec. 31, 2020

(30) Foreign Application Priority Data
Jun. 25, 2019 (CN) .......................... 201920965883.8

(51) Int. Cl.
*B23P 19/00* (2006.01)
*G07F 11/38* (2006.01)

(52) U.S. Cl.
CPC .......... *B23P 19/004* (2013.01); *B23P 19/002* (2013.01)

(58) Field of Classification Search
CPC ........ B23P 19/002; B23P 19/004; G07F 11/38

USPC .......................... 198/389, 390; 221/266, 268
See application file for complete search history.

(56) References Cited

U.S. PATENT DOCUMENTS

| | | | | |
|---|---|---|---|---|
| 3,297,199 A * | 1/1967 | Law ........................ | B23Q 7/16 | 221/93 |
| 4,122,975 A * | 10/1978 | Lowery ..................... | B27F 7/02 | 198/389 |
| 4,694,974 A * | 9/1987 | Heck ...................... | B23P 19/003 | 221/263 |
| 5,067,632 A * | 11/1991 | Aubry .................... | B23K 9/206 | 221/266 |
| 5,480,087 A * | 1/1996 | Young ................... | B23P 19/003 | 221/268 |
| 5,777,246 A * | 7/1998 | Woods ..................... | G01B 5/14 | 73/865.8 |
| 8,083,057 B2 * | 12/2011 | Kuboyama ............. | B25B 23/04 | 206/338 |
| 8,813,944 B2 * | 8/2014 | Tanner ................. | B65G 47/256 | 198/395 |
| 9,005,206 B2 * | 4/2015 | Ampuero ........... | A61B 17/8695 | 606/86 R |

(Continued)

*Primary Examiner* — Douglas A Hess
(74) *Attorney, Agent, or Firm* — ScienBiziP, P.C.

(57) ABSTRACT

A device to present screws of different sizes and characteristics for insertion and fastening in manufacturing processes includes an aligning module and a dispensing module. The aligning module includes a track with two supporting plates. One end of each supporting plate is chamfered and the two supporting plates are spaced to form a first receiving space and a second receiving space for receiving the screws, a screening module functions to brush away screws which do not fall correctly into place on the track. The dispensing module includes a circular member with notches to receive screws transported by the track.

18 Claims, 7 Drawing Sheets

(56) References Cited

U.S. PATENT DOCUMENTS 9,150,360 B1 * 10/2015 Wong ..................... B25B 23/04
9,352,507 B2 * 5/2016 Heller ................. B29C 49/4205
9,833,940 B2 * 12/2017 Marastoni ........... B29C 49/4205
9,999,949 B2 * 6/2018 Hester .................. B23P 19/003

* cited by examiner

SCREW-PRESENTING DEVICE

FIELD

The subject matter herein generally relates to manufacturing aids.

BACKGROUND

During the course of manufacture parts require screws for connection.

Whether a manual locking screw or an automatic locking screw using a locking screw machine is used, a device capable of arranging and presenting screws at a regular interval is required to improve work efficiency. Regular presenting equipment does not provide stable and tidy screws because intelligent equipment is very expensive.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 1:
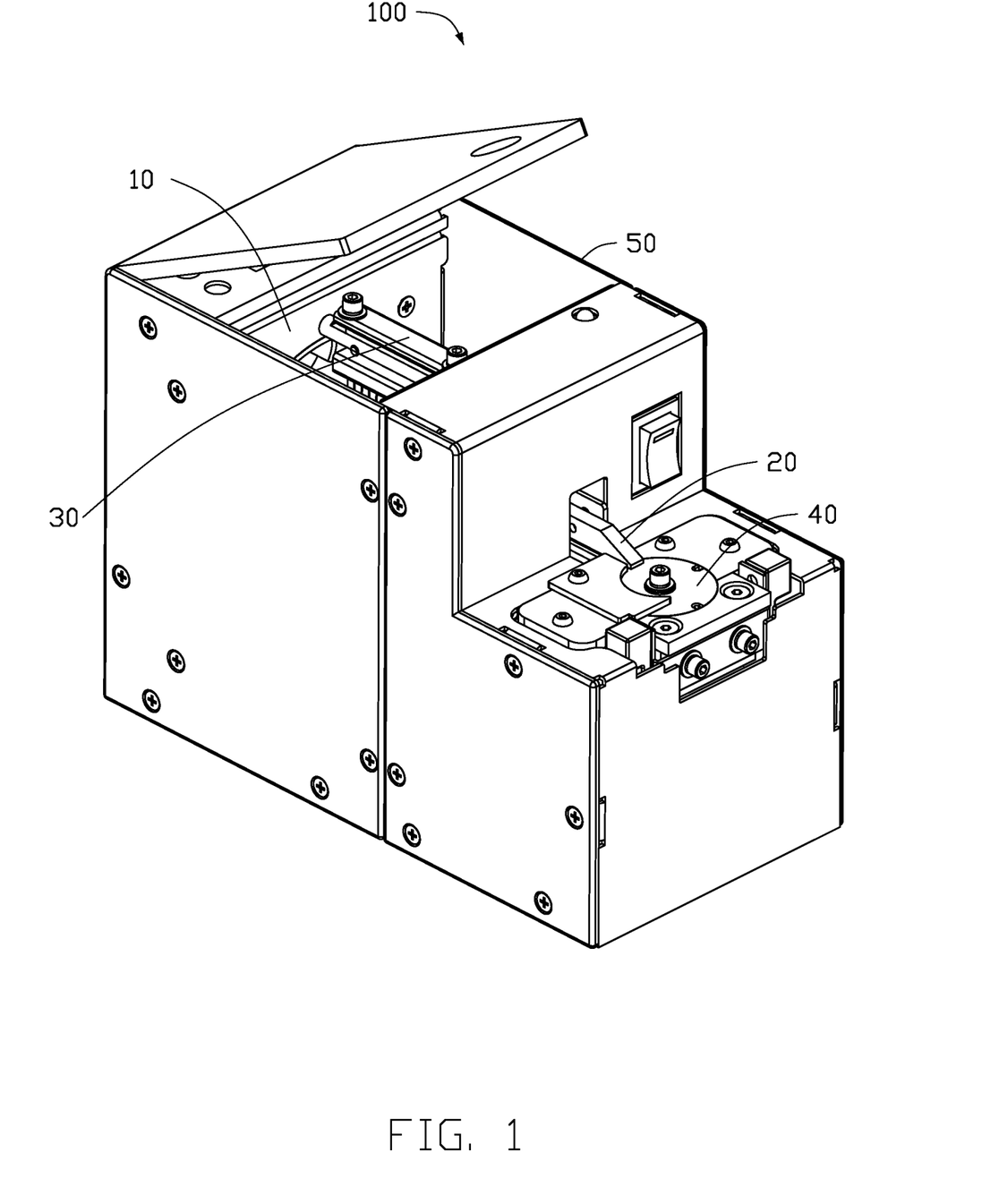
FIG. 1 is a schematic diagram of an embodiment of a screw presenting device.
Figure 2:
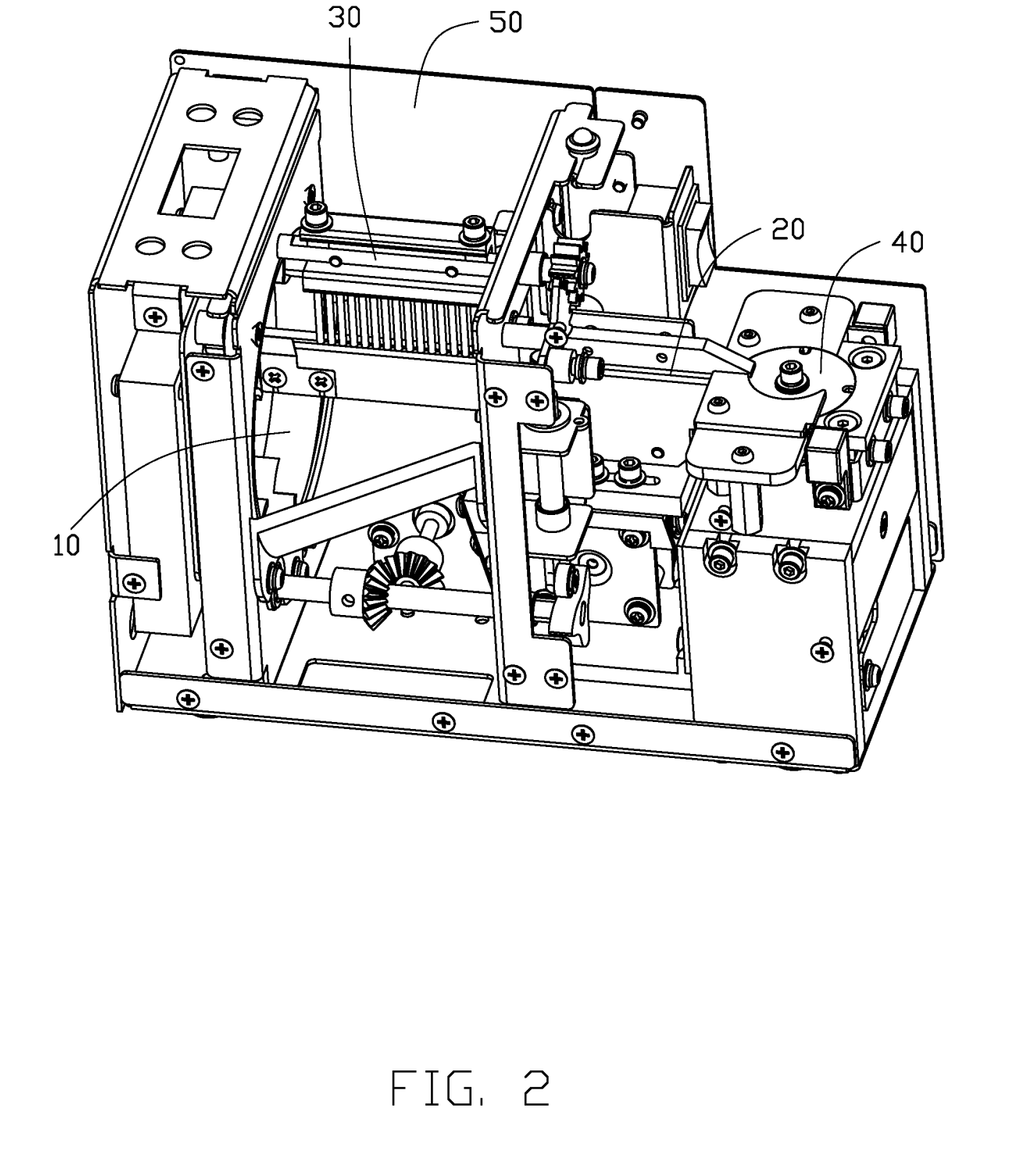
FIG. 2 is another schematic diagram of the device of FIG. 1.

FIGS. 1 and 2 illustrate a screw presenting device 100 in accordance with an embodiment of the present disclosure. The screw presenting device 100 is configured to provide a plurality of screws 200 (shown in FIG. 3) for a locking screw machine (not shown).

In at least one embodiment, the screw presenting device 100 includes a feeding module 10, an aligning module 20, a screening module 30, and a dispensing module 40.

The feeding module 10 provides the screws 200 to the aligning module 20. The aligning module 20 arranges the screws 200 and sequentially conveys the aligned screws 200 to the dispensing module 40. The screening module 30 filters the screws 200 on the aligning module 20, such that the screws 200 on the aligning module 20 are regularly arranged. The dispensing module 40 receives the screws 200 conveyed by the aligning module 20 and provides the screws 200 one by one to the locking screw machine.

Figure 3:
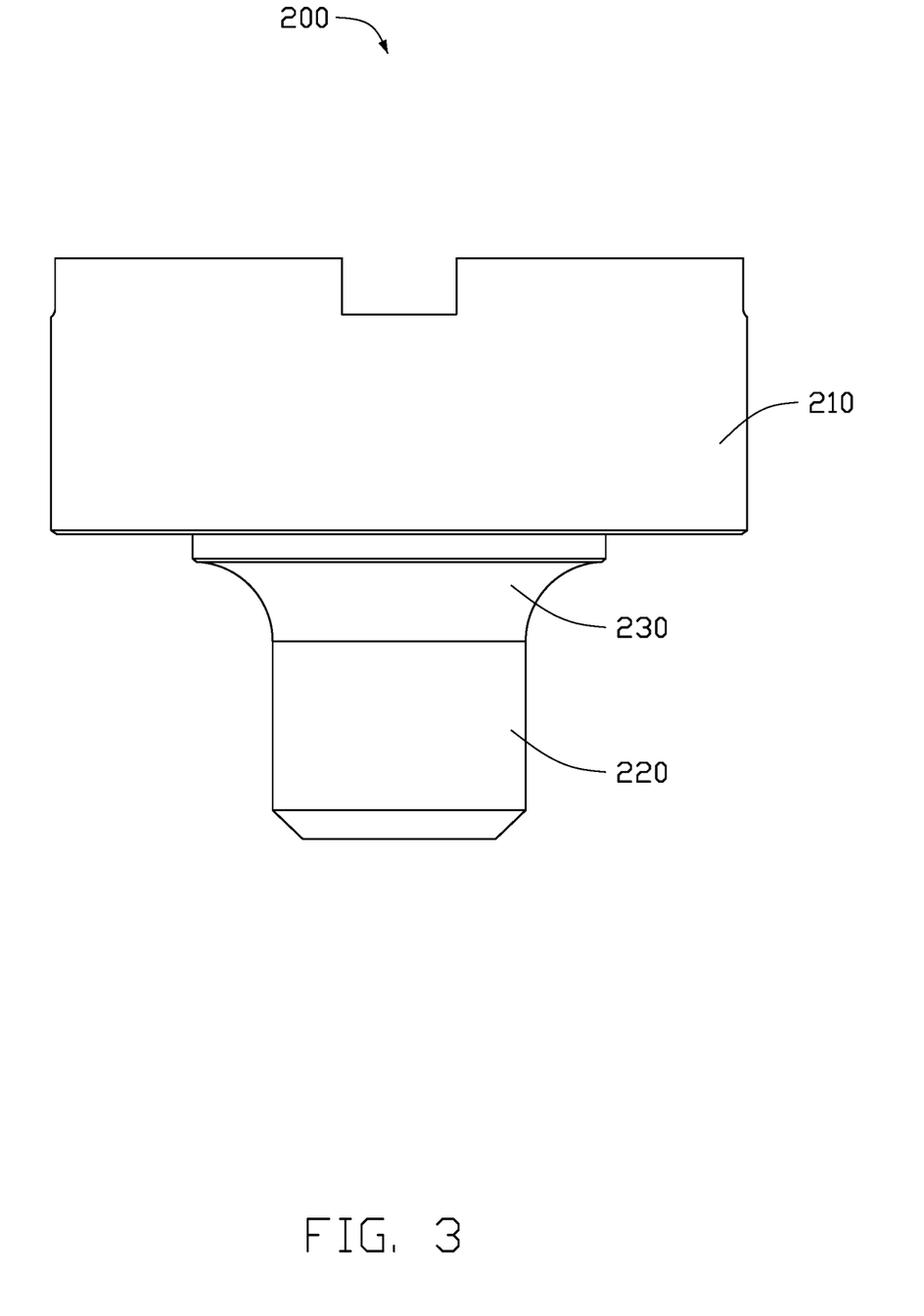
FIG. 3 is a schematic diagram of an embodiment of a screw.

FIG. 3 illustrates that the screw 200 includes a screwhead 210, a stem 220, and a step 230. The step 230 is fixedly coupled between the screwhead 210 and the stem 220. In at least one embodiment, the step 230 has a substantially trapezoidal cross section.

Figure 4:
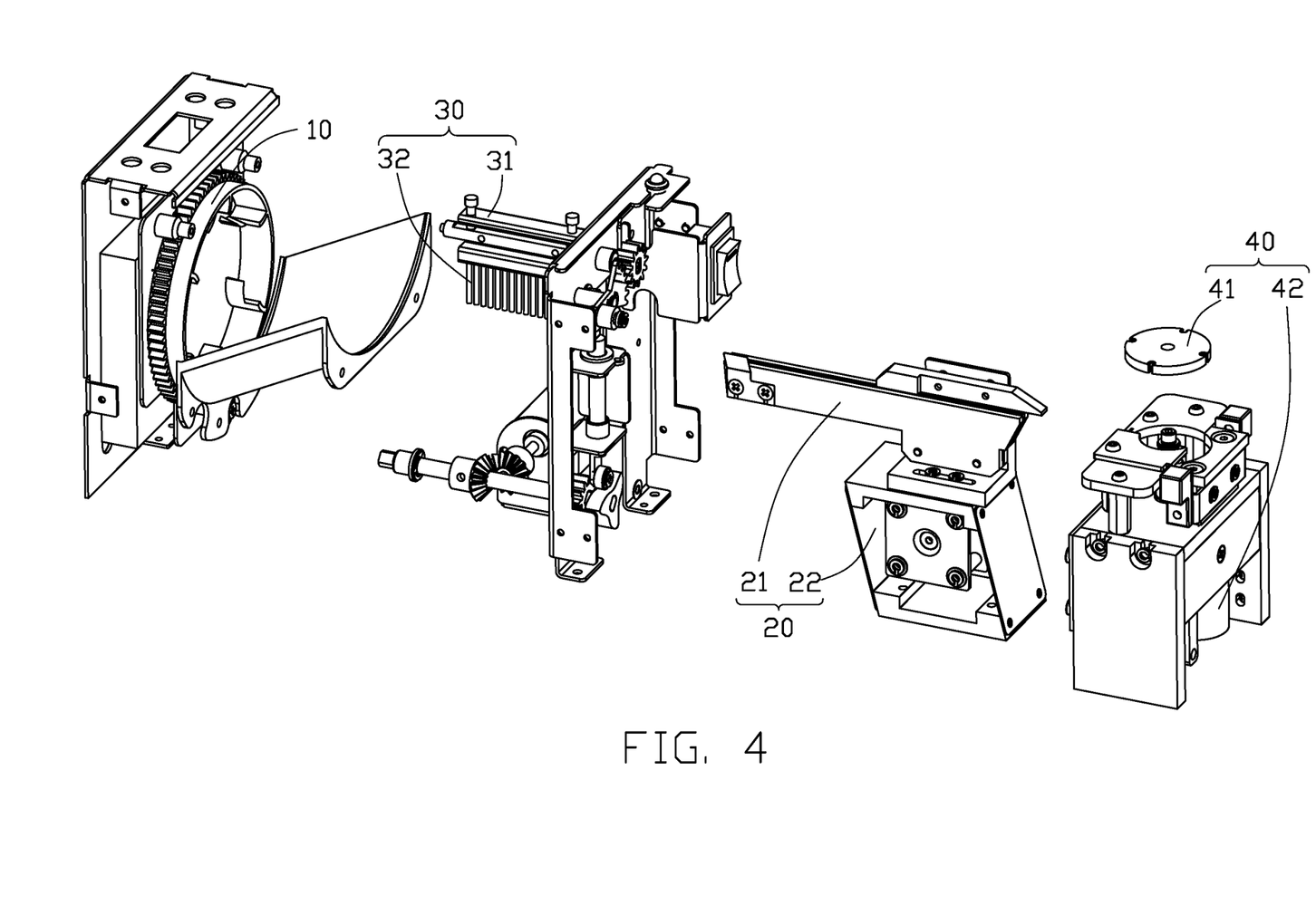
FIG. 4 is an exploded view of an embodiment of the device of FIG. 2.
Figure 5:
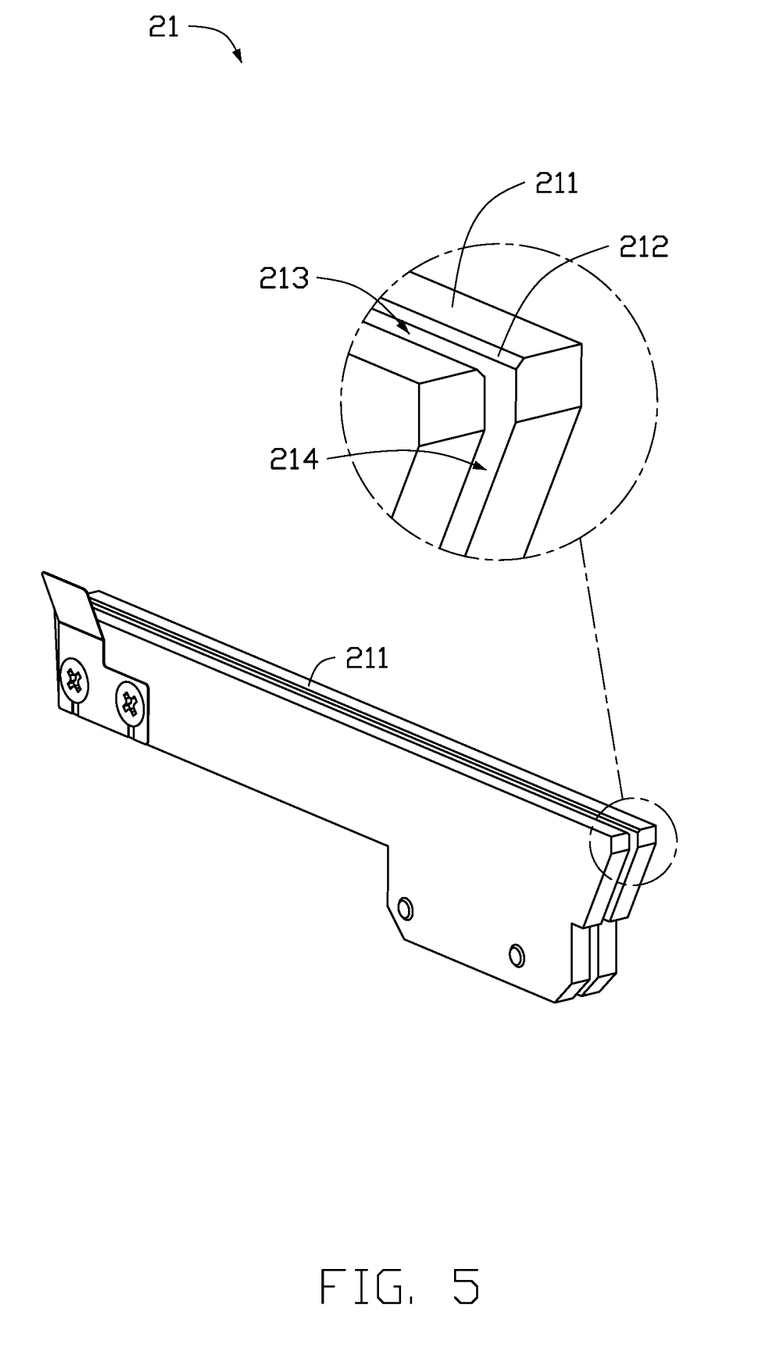
FIG. 5 is a diagram of an embodiment of a track in the device of FIG. 2.

FIGS. 4 and 5 illustrate that the aligning module 20 includes a track 21 and a vibration mechanism 22. The track 21 is coupled to the vibration mechanism 22.

In the embodiment, the track 21 is fixedly coupled to but detachable from the vibration mechanism 22.

The track 21 can be coupled to the vibration mechanism 22 by a connecting device (not shown). In the embodiment, the connecting device can be a screw or a stem.

When it is necessary to demount the track 21, it is only necessary to remove the connecting device. When it is necessary to reinstall the track 21, it is only necessary to re-attach the track 21 to the vibrating mechanism 22 by the connecting device.

In the embodiment, one end of the track 21 is configured to receive the screw 200 from the feeding module 10, and the screw 200 is conveyed to the dispensing module 40 under the effect of vibration of the vibration mechanism 22.

The track 21 includes two supporting plates 211, and one end of each supporting plate 211 defines a chamfer 212.

The ends of the two supporting plates 211 away from the chamfer 212 are fixed to the vibration mechanism 22 at regular intervals, and the chamfer 212 on one supporting plate 211 is opposite to the chamfer 212 on the another supporting plate 211. Therefore, the chamfered ends of the two supporting plates 211 form a receiving space 213, and the other end of the two supporting plates 211 away from the chamfer 212 form a receiving space 214. In at least one embodiment, the receiving space 214 is connected to the receiving space 213.

When the screw 200 supplied by the feeding module 10 is placed on the track 21, the receiving space 213 and the receiving space 214 cooperates to receive the screw 200.

In at least one embodiment, the receiving space 213 receives the step 230 of the screw 200, and the receiving space 214 receives the stem 220 of the screw 200. The upper surfaces of the two supporting plates 211 are in contact with the screwhead 210 of the screw 200, to support the screwhead 210. Therefore, the screws 200 that are accommodated by the receiving space 213 and the receiving space 214 are regularly arranged on the track 21 and are maintained at the same height with respect to the track 21.

If the screw 200 supplied by the feeding module 10 does not successfully fall into place on the track 21, the screw 200 may be elevated in height relative to the track 21, and the height of such screw 200 with respect to the track 21 will be higher than a screw 200 that is regularly arranged on the track 21. The step 230 is accommodated in the receiving space 213 formed by the chamfer 212, the configuration of the track 21 prevents the height of the screw 200 being too low when the screws 200 are regularly arranged on the track 21.

In the embodiment, a distance between the ends of the two supporting plates 211 away from the chamfer 212 corresponds to a diameter of the stem 220, and the distance between the ends of the two supporting plates 211 away from the chamfer 212 is the diameter of the stem 220 plus 0.1 mm. The size of the chamfer 212 corresponds to the size of the step 230 of the screw 200, and the size of the chamfer 212 is C0.3.

The screening module 30 is rotatably disposed above the aligning module 20. In the embodiment, the screening module 30 is rotatably disposed directly above the aligning module 20. The screening module 30 is configured to brush away from the track 21 any screws 200 on the track 21 which are not regularly arranged, such irregular screws 200 then falling into the feeding module 10.

Figure 6:
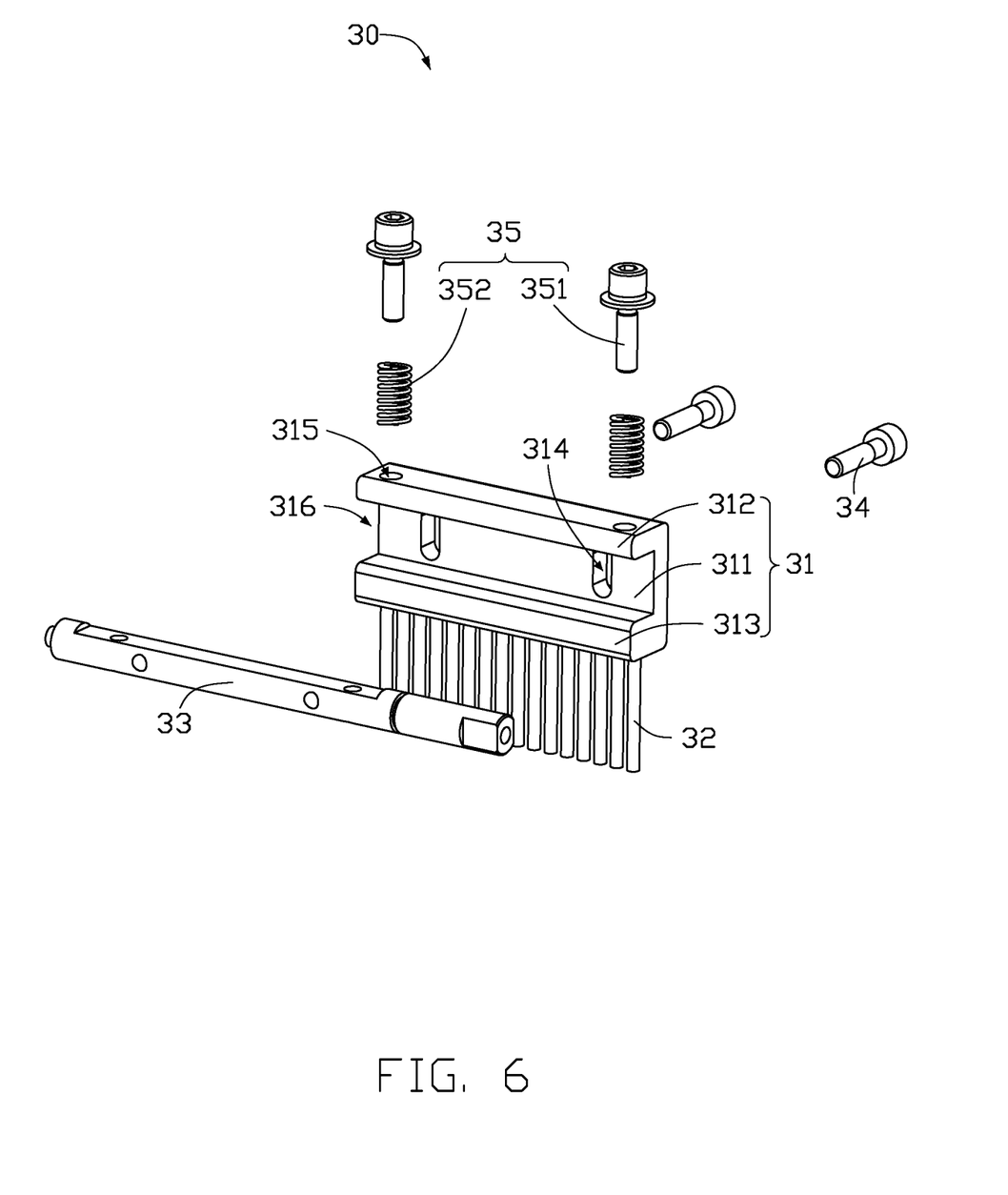
FIG. 6 is an exploded view of an embodiment of a screening module in the device of FIG. 2.

FIG. 6 illustrates that the screening module 30 includes a fixing portion 31, a brush 32, a fixing rod 33, a connecting member 34, and an adjusting apparatus 35.

The fixing portion 31 includes a body 311, a first mounting portion 312, and a second mounting portion 313.

The body 311 defines a through slot 314, and the first mounting portion 312 defines a through hole 315.

The first mounting portion 312 and the second mounting portion 313 extend perpendicularly from opposite ends of the body 311 toward the same side. The body 311, the first mounting portion 312, and the second mounting portion 313 together form a mounting slot 316.

In the embodiment, a first end of the brush 32 is fixedly coupled to the second mounting portion 313, and a second end of the brush 32 is suspended above the track 21. The fixing rod 33 is rotatably disposed on the feeding module 10, and is received in the mounting slot 316. The connecting member 34 passes through the through slot 314 to be fixedly coupled to the fixing rod 33 in the mounting slot 316.

In the embodiment, a size of the portion of the connecting member 34 received in the through slot 314 is smaller than a size of the through slot 314. Therefore, the fixing rod 33 can move in the through slot 314 relative to the body 311, through the connecting member 34.

In the embodiment, the connecting member 34 may be a screw.

The adjusting apparatus 35 is configured to adjust the position of the fixing portion 31 relative to the fixing rod 33, thereby adjusting the distance of the brush 32 relative to the track 21. When the end of the brush 32 near the track 21 passes directly above the track 21, the height of the brush 32 relative to the track 21 is higher than the height of the regularly aligned screws 200 relative to the track 21 but lower than the height of irregularly arranged screws 200 relative to the track 21. The fixing portion 31 can be driven to rotate by the fixing rod 33, thereby driving the brush 32 to swing above the track 21.

When the brush 32 passes directly above the track 21, the brush 32 brushes any irregularly arranged screws 200 on the track 21 away from the track 21.

In at least one embodiment, the adjusting apparatus 35 includes an adjusting member 351 and a spring 352. In the embodiment, the adjusting member 351 may be a screw. The adjusting member 351 passes through the through hole 315, and is screwed with the fixing rod 33. The spring 352 is sleeved on the adjusting member 351 and is between the first mounting portion 312 and the fixing rod 33. The length of the spring 352 is greater than the distance between the first mounting portion 312 and the fixing rod 33.

When it is necessary to increase the height of the brush 32 above the track 21, the adjusting member 351 is adjusted to move in a direction away from the track 21. Thus the spring 352 pushes the first mounting portion 312 under elastic force to drive the body 311 and the second mounting portion 313 to move away from the track 21, thereby driving the brush 32 to move away from the track 21, and the connecting member 34 moves relative to the body 311 toward the second mounting portion 313 in the through slot 314.

To decrease the distance between the brush 32 and the track 21, the adjusting member 351 is adjusted to move in a direction closer to the track 21, to drive the first mounting portion 312 to compress the spring 352, and further driving the body 311 and the second mounting portion 313 to move in the direction of the track 21. The brush 32 is thus moved closer to the track 21, and the connecting member 34 moves relative to the body 311 toward the first mounting portion 312 in the through slot 314.

In at least one embodiment, the dispensing module 40 includes a circular member 41 and a driving device 42. The circular member 41 is rotatably disposed at an end adjacent to the track 21. In the embodiment, the circular member 41 is detachably disposed at an end adjacent to the track 21. The circular member 41 is rotatably driven by the driving device 42 to receive the screws 200 conveyed by the track 21, and supplies the screws 200 to the locking screw device.

In the embodiment, the driving device 42 may be a motor.

Figure 7:
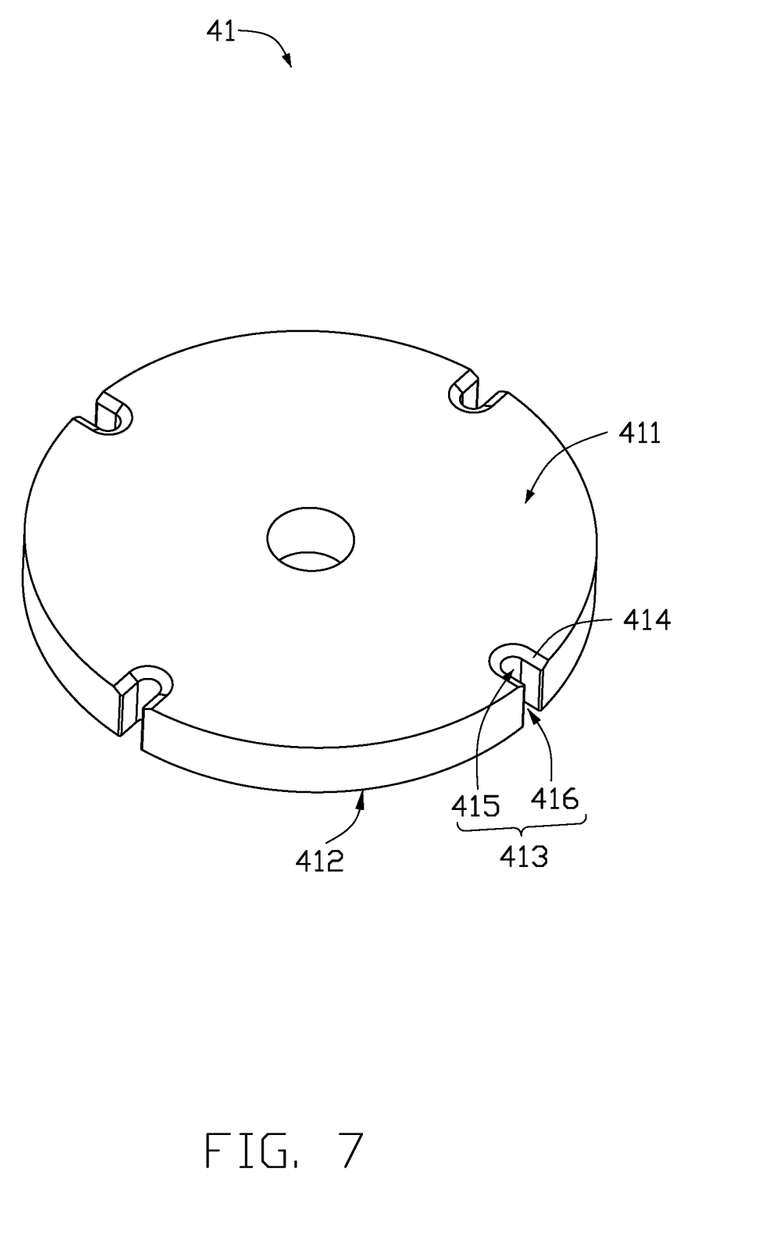
FIG. 7 is a diagram of an embodiment of a circular member in the device of FIG. 2.

FIG. 7 illustrates that the circular member 41 includes a first surface 411 and a second surface 412. The first surface 411 is opposite to the second surface 412.

The first surface 411 is disposed adjacent to the track 21. The first surface 411 supports the screwhead 210 of the screw 200 conveyed by the track 21. The circular member 41 defines at least one notch 413, the notch 413 passes through the first surface 411, the second surface 412, and periphery of the circular member 41.

The first surface 411 of the circular member 41 defines a chamfer 414 near the notch 413. In the embodiment, one end of the notch 413 adjacent to the chamfer 414 forms a receiving space 415, and the other end of the notch 413 away from the chamfer 414 forms a receiving space 416. The receiving space 415 is connected to the receiving space 416.

The receiving space 415 and the receiving space 416 cooperate to receive the screw 200. In the embodiment, the receiving space 415 receives the step 230 of the screw 200 conveyed by the track 21, and the receiving space 416 receives the stem 220 of the screw 200 conveyed by the track 21. Thus, the screws 200 conveyed to the dispensing module 40 are regularly distributed in the notch 413 of the circular member 41.

In the embodiment, the width of the notch 413 is the same as the distance between the ends of the two supporting plates 211 away from the chamfer 212. The size and configuration of the chamfer 414 is same as those of the chamfer 212.

For adaptability to various screws, only the track 21 needs to be replaced in the device 100, together with the circular member 41 corresponding to the screw 200. That is, the size of the chamfer 212 and of the end of the two supporting plates 211 away from the chamfer 212 respectively correspond to the size of the step 230 and the stem 220 of the screw 200 to be used. The width of the chamfer 414 on the circular member 41 and the width of the end of the notch 413 away from the chamfer 414 respectively correspond to the size of the step 230 and the stem 220 of the screw 200 to be used. Different types of screws 200 can thus be accommodated.

In the embodiment, the screw presenting device 100 further includes a housing 50. The feeding module 10, the aligning module 20, and the screening module 30 are received in the housing 50.

The screw presenting device 100 defines the opposite chamfers 212 at one end of the two spaced apart supporting plates 211 of the aligning module 20, and the two supporting plates 211 can form the receiving space 213 and the receiving space 214, to cooperate to receive the screws 200. The screw presenting device 100 further defines the chamfer 414 on the first surface 411 of the circular member 41, and the receiving space 415 and the receiving space 416 is formed in the notch 413, to cooperate to receive the screws 200.

Therefore, the screws 200 can be transferred from the aligning module to the dispensing module 40 in a regular array.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A screw presenting device comprising:
an aligning module comprising a track; wherein the track comprises two supporting plates, the two supporting plates are spaced apart; an end of two supporting plates defines a first chamfer, and the first chamfers on the two supporting plates are oppositely arranged; wherein the end of the two supporting plates are provided with the first chamfers forms a first receiving space, another end of the two supporting plates are away from the first chamfers forms a second receiving space, the first receiving space is connected to the second receiving space, and the first receiving space and the second receiving space cooperates to receive the screw; and
a dispensing module comprising a circular member; wherein the circular member receives the screw conveyed from the track; wherein the circular member comprises a first surface and a second surface, the first surface is opposite to the second surface, the first surface is disposed adjacent to the track, the circular member defines at least one notch, and the notch passes through the first surface, the second surface, and periphery of the circular member; wherein the first surface of the circular member defines a second chamfer, an end of the notch adjacent to the second chamfer forms a third receiving space, and another end of the notch away from the second chamfer forms a fourth receiving space, the third receiving space is connected to the fourth receiving space, and the third receiving space and the fourth receiving space cooperates to receive the screw; and
wherein the screw presenting device further comprises a screening module, the screening module comprises a brush and a fixing rod, the fixing rod is rotatably disposed above the track, and the fixing rod drives the brush to rotate above the track, to filter the screws on the track.

2. The screw presenting device of claim 1, wherein the screw comprises a screwhead, a stem, and a step, the step is fixedly coupled between the screwhead and the stem; wherein the first receiving space and the third receiving space receives the step, and the second receiving space and the fourth receiving space receives the stem.

3. The screw presenting device of claim 2, wherein a distance between the ends of the two supporting plates away from the first chamfers corresponds to a diameter of the stem, and a size of the first chamfer corresponds to a size of the step.

4. The screw presenting device of claim 2, wherein the distance between the ends of the two supporting plates away from the first chamfer is the diameter of the stem plus 0.1 mm, and the size of the first chamfer is C0.3.

5. The screw presenting device of claim 1, wherein the width of the notch is the same as the distance between the ends of the two supporting plates away from the first chamfer, and the second chamfer has the same size as the first chamfer.

6. The screw presenting device of claim 1, wherein the screening module further comprises a fixing portion and a connecting member, the fixing portion comprises a body, a first mounting portion, and a second mounting portion, an end of the brush is fixedly coupled to the second mounting portion, the body defines a through slot, and the first mounting portion and the second mounting portion extend perpendicularly from opposite ends of the body toward the same side; wherein the body, the first mounting portion and the second mounting portion together form a mounting slot, the fixing rod is received in the mounting slot, and the connecting member passes through the through slot to be fixed with the fixing rod.

7. The screw presenting device of claim 6, wherein the screening module further comprises an adjusting apparatus, and the adjusting apparatus comprises an adjusting member and a spring; wherein the first mounting portion defines a through hole, the adjusting member passes through the through hole, and is screwed with the fixing rod, the spring sleeves on the adjusting member and abuts between the first mounting portion and the fixing rod.

8. The screw presenting device of claim 7, wherein a length of the spring is greater than a distance between the first mounting portion and the fixing rod.

9. The screw presenting device of claim 1, wherein the screw presenting device further comprises a housing, the aligning module and the screening module are received in the housing.

10. The screw presenting device of claim 9, wherein the screw presenting device further comprises a feeding module, and the feeding module provides the screw to the aligning module.

11. A screw presenting device comprising:
an aligning module comprising a track; wherein the track comprises two supporting plates, the two supporting plates are spaced apart; an end of two supporting plates defines a first chamfer, and the first chamfers on the two supporting plates are oppositely arranged; wherein the end of the two supporting plates are provided with the first chamfers forms a first receiving space, another end of the two supporting plates are away from the first chamfers forms a second receiving space, the first receiving space is connected to the second receiving space, and the first receiving space and the second receiving space cooperates to receive the screw; and
a dispensing module comprising a circular member; wherein the circular member receives the screw conveyed from the track; wherein the circular member comprises a first surface and a second surface, the first surface is opposite to the second surface, the first surface is disposed adjacent to the track, the circular member defines at least one notch, and the notch passes through the first surface, the second surface, and periphery of the circular member; wherein the first surface of the circular member defines a second chamfer, an end of the notch adjacent to the second chamfer forms a third receiving space, and another end of the notch away from the second chamfer forms a fourth receiving space, the third receiving space is connected to the fourth receiving space, and the third receiving space and the fourth receiving space cooperates to receive the screw; and a screening module comprising a brush and a fixing rod; wherein the fixing rod is rotatably disposed above the track, and the fixing rod drives the brush to rotate above the track, to filter the screws on the track;

wherein the screw comprises a screwhead, a stem, and a step, the step is fixedly coupled between the screwhead and the stem; wherein the first receiving space and the third receiving space receives the step, and the second receiving space and the fourth receiving space receives the stem.

12. The screw presenting device of claim 11, wherein a distance between the ends of the two supporting plates away from the first chamfers corresponds to a diameter of the stem, and a size of the first chamfer corresponds to a size of the step.

13. The screw presenting device of claim 11, wherein the width of the notch is the same as the distance between the ends of the two supporting plates away from the first chamfer, and the second chamfer has the same size as the first chamfer.

14. The screw presenting device of claim 13, wherein the screening module further comprises a fixing portion and a connecting member, the fixing portion comprises a body, a first mounting portion, and a second mounting portion, an end of the brush is fixedly coupled to the second mounting portion, the body defines a through slot, and the first mounting portion and the second mounting portion extend perpendicularly from opposite ends of the body toward the same side; wherein the body, the first mounting portion and the second mounting portion together form a mounting slot, the fixing rod is received in the mounting slot, and the connecting member passes through the through slot to be fixed with the fixing rod.

15. The screw presenting device of claim 14, wherein the screening module further comprises an adjusting apparatus, and the adjusting apparatus comprises an adjusting member and a spring; wherein the first mounting portion defines a through hole, the adjusting member passes through the through hole, and is screwed with the fixing rod, the spring sleeves on the adjusting member and abuts between the first mounting portion and the fixing rod.

16. The screw presenting device of claim 15, wherein a length of the spring is greater than a distance between the first mounting portion and the fixing rod.

17. The screw presenting device of claim 11, wherein the distance between the ends of the two supporting plates away from the first chamfer is the diameter of the stem plus 0.1 mm, and the size of the first chamfer is C0.3.

18. The screw presenting device of claim 11, wherein the screw presenting device further comprises a housing, the aligning module and the screening module are received in the housing.

* * * * *